J. A. FLEMING.
AUTOMOBILE WHEEL.
APPLICATION FILED SEPT. 22, 1908.
931,403.
Patented Aug. 17, 1909.
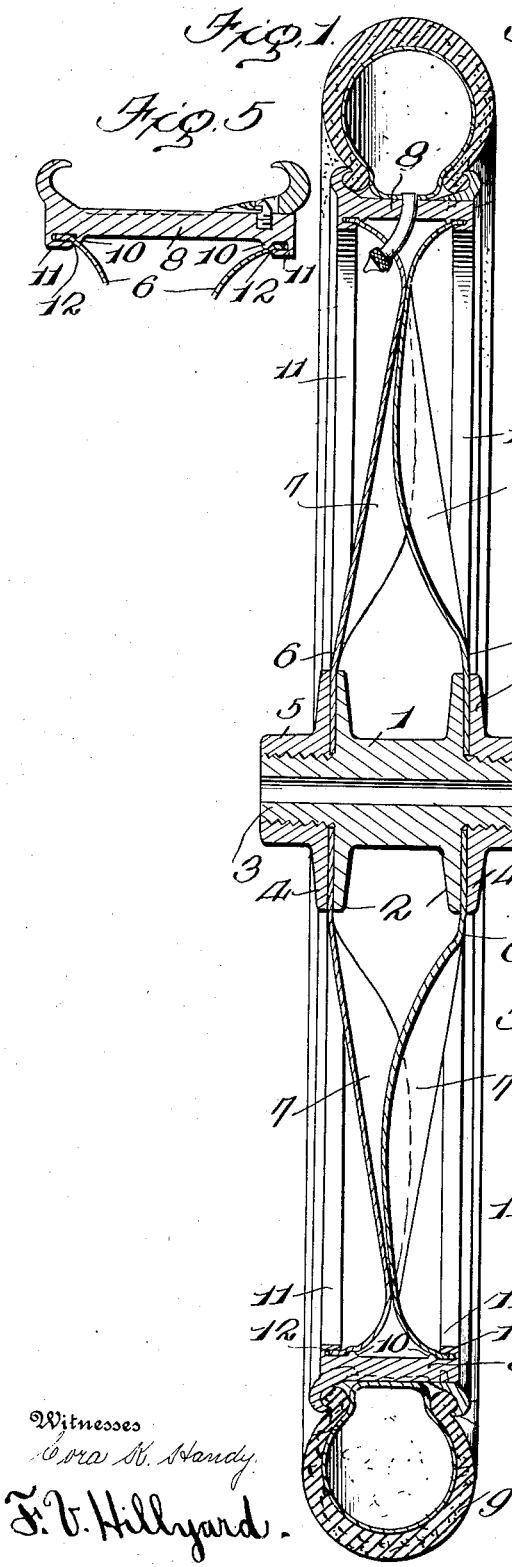
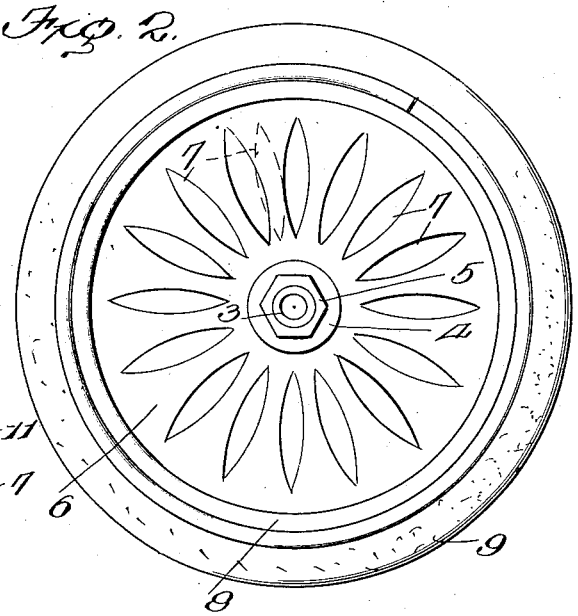
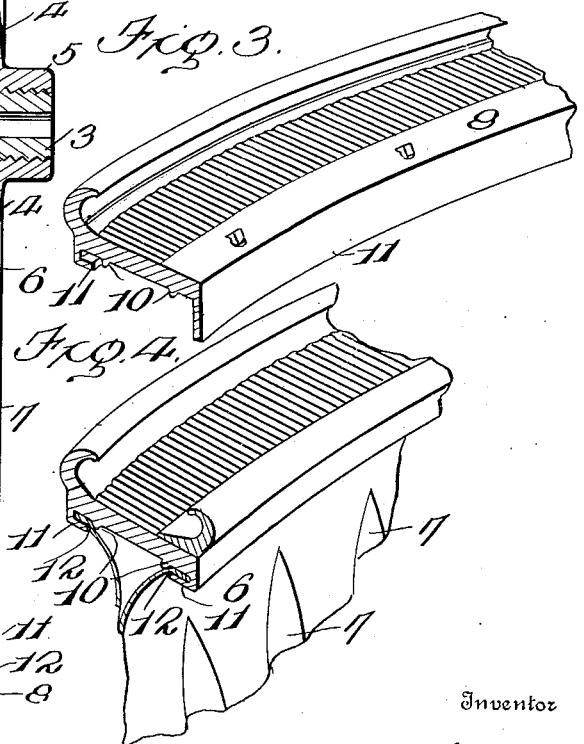
Witnesses
Cora K. Handy
F. V. Hillyard.
Inventor
James A. Fleming
By Hart Lacey, Attorneys

UNITED STATES PATENT OFFICE.

JAMES A. FLEMING, OF DANVILLE, ILLINOIS.

AUTOMOBILE-WHEEL.

No. 931,403.     Specification of Letters Patent.    Patented Aug. 17, 1909.

Application filed September 22, 1908. Serial No. 454,163.

*To all whom it may concern:*

Be it known that I, JAMES A. FLEMING, a citizen of the United States, residing at Danville, in the county of Vermilion and State of Illinois, have invented certain new and useful Improvements in Automobile-Wheels, of which the following is a specification.

The present invention relates to vehicle wheels and aims to provide a novel structure whereby in the formation of wheels spokes may be dispensed with and a firm and substantial connection had between the rim and hub and the intermediate body or connecting means, which in the present instance consists of plates having their rim portions flared and their center portions outwardly dished.

The invention also aims to produce a rim embodying a peculiar construction admitting of its ready connection with the body of the wheel, and to produce a device which is strong, durable and easily assembled so as to produce a practical wheel adaptable for general usages.

The invention further consists of the novel features and details of construction set forth, illustrated, and claimed.

Referring to the drawings forming a part of the specification: Figure 1 is a central vertical cross section of a wheel embodying my invention. Fig. 2 is a side view of the wheel on a reduced scale. Fig. 3 is a view in perspective of a portion of the rim detached from the body of the wheel and having one of the flanges straightened. Fig. 4 is a similar view, showing the rim attached to the wheel. Fig. 5 is a cross section of the outer portion of the wheel.

Corresponding and like parts are referred to in the following description and indicated in all the views of the drawings by the same reference characters.

The wheel consists of a hub, a rim and an intermediate connecting or body part.

The hub 1 comprises spaced flanges 2 and reduced ends 3 which are threaded and receive clamp collars 4 having hub portions 5 internally threaded to match the threads of the reduced ends 3, the hub portions 5 being polygonal to receive a wrench or other tool to admit of tightening or loosening the clamp collars.

The body portion of the wheel comprises two disks, or circular plates 6, centrally apertured to receive the reduced ends 3 of the hub 1 and clamped between the flanges 2, and the collars 4. The outer or rim portions of the disks, or plates 6, flare and terminate in outer flanges which form connecting means with the rim. The central portions of the disks, or plates, are outwardly dished, whereas the intermediate portions are brought together as indicated most clearly in Fig. 1. To stiffen or strengthen the plates, or disks, each is formed with a series of radial depressions 7 forming inner ribs, and the plates are so arranged that the ribs of one alternate with the ribs of the other as in Fig. 1, thereby admitting of the outer portion of the plates coming close together and the ribs of one touching the other whereby the plates are mutually braced near their outer edges.

A rim 8 performs the dual office of connecting the outer edges of the disks 6 and forming a seat for a tire 9. On the inner side of the rim 8 are ribs 10 and flanges 11. The ribs 10 are located a short distance from the edges of the rim, whereas the flanges 11 are at the edges and are adapted to be bent over the flanges 12 of the plates 6 and secure the same. The flanges 11 are bendable and confine the flanges 12 to the edge portions of the rim 8 exterior to the ribs 10, which prevent the inward displacement of the flanges 12.

The rim 8 is provided upon its upper face with flanges 13 and 15 disposed at the opposite edges of the same, beneath which are engaged the rolls or welts of the casing $9^a$ of the tire, in order to hold the same in position. The inner tube $9^b$ of the tire is provided with a valve 24 which extends inwardly through the rim 8 and is thus curved laterally through a side of one of the plates 6 and serves as a means for the introduction of the air into the tire.

From the foregoing description, taken in connection with the accompanying drawings, it will be seen that I have provided a wheel which is particularly adapted for use on automobiles on which rubber tires are used; and it is observed that by dispensing with the use of spokes, which have a tendency to retard the movement of the wheel and to scatter the dust by the rapid revolution thereof, that I have simplified the construction of wheels.

In cleaning spokeless wheels, much less labor will be required to keep them in a clean condition, than where a number of spokes are to be washed.

Having thus described the invention, what I claim as new is:—

1. In a wheel of the character specified, comprising a body formed of complemental members having lateral flanges at their outer edges, a rim fitted to said body and having ribs and flanges upon its inner side, said flanges being bent over the lateral flanges of the body members to confine the same between the said ribs and portions of the rim between the ribs and bendable flanges.

2. A wheel as specified, comprising a hub, plates engaged over the opposite ends of said hub, collars mounted in threaded relation upon opposite ends of said hub, and engaged against said plates, ribs radially formed on said plates and adapted for alternate engagement with one another, and a rim mounted about the outer edges of said plates.

In testimony whereof I affix my signature in presence of two witnesses.

JAMES A. FLEMING.

Witnesses:
WILL B. COSSEY,
CARL IDLE.